United States Patent [19]

Iizuka et al.

[11] Patent Number: 4,766,721
[45] Date of Patent: Aug. 30, 1988

[54] COMBUSTOR FOR GAS TURBINE

[75] Inventors: Nobuyuki Iizuka; Yoji Ishibashi; Isao Sato; Fumiyuki Hirose; Hiroshi Inose; Katsukuni Hisano; Katsuo Wada; Seiichi Kirikami; Michio Kuroda; Yoshihiro Uchiyama, all of Hitachi, Japan

[73] Assignee: Hitachi, Ltd., Tokyo, Japan

[21] Appl. No.: 917,973

[22] Filed: Oct. 14, 1986

[30] Foreign Application Priority Data

Oct. 11, 1985 [JP] Japan .................. 60-224747

[51] Int. Cl.⁴ .................. F02C 9/18
[52] U.S. Cl. .................. 60/39.23; 60/39.24; 60/747
[58] Field of Search .............. 60/733, 746, 747, 39.23, 60/39.07, 39.29

[56] References Cited

U.S. PATENT DOCUMENTS 2,620,626 12/1952 Lysholm .................. 60/39.23
4,112,676 9/1978 De Corso .................. 60/733
4,603,548 8/1986 Ishibashi et al. .................. 60/746

FOREIGN PATENT DOCUMENTS

2421708 11/1975 Fed. Rep. of Germany .
55-45739 11/1980 Japan .
192728 11/1982 Japan .................. 60/746
2073399 10/1981 United Kingdom .

Primary Examiner—Louis J. Casaregola
Attorney, Agent, or Firm—Antonelli, Terry & Wands

[57] ABSTRACT

A combustor of two-stage combustion type in which fuel is supplied only from primary fuel nozzles for combustion only in primary combustion chamber under the operating condition where gas turbine load is low, and premixed mixture is supplied into a secondary combustion chamber provided on the downstream side of the primary combustion chamber for combustion in both the primary and secondary combustion chambers under the operating condition where the load is high. An air-bleed passageway opens on a downstream side of air holes for intaking secondary combustion air to be mixed with secondary fuel and communicates with the outside of the combustor. The air-bleed passageway is provided with a regulating valve and the secondary combustion air is bled at the minimum point of the load where the secondary fuel is supplied so that the fuel to air ratio of secondary premixed mixture may not be excessively lean, thereby reducing the production of non-burned components.

9 Claims, 7 Drawing Sheets

GAS TURBINE LOAD (%)

COMBUSTOR FOR GAS TURBINE

FIELD OF THE INVENTION

The present invention relates to a combustor for supplying working gas of high temperature and high pressure to a gas turbine, and, more particularly, to a gas turbine combustor of two-stage combustion type utilizing natural gas (LNG) as a fuel.

In, for example, British Pat. No. 2146425 a method is proposed wherein a combustor has a primary fuel nozzle for forming pilot flame at the head of the combustor, a secondary fuel nozzle for supplying premixed air on the downstream side of the flow of combustion gas, and fuel is supplied only to the primary fuel nozzle or to both the primary and secondary fuel nozzles in dependence upon the load of a gas turbine so that low temperature combustion is conducted over the whole range of load of the gas turbine.

Such premixed stage combustion has an advantage that the production of nitrogen oxide (NOx) is reduced because the low temperature combustion can be conducted. It also has a problem, however, that it is difficult to complete burn the secondary fuel and such unburned components as CO, HC are exhausted when the fuel begins to be supplied from the secondary fuel nozzle in the process of the gas turbine load's varying from low load to high load.

Also, in a gas turbine for driving a generator, although the gas turbine is driven at a certain speed regardless of the load thereof when the generator reaches a certain synchronous speed, the amount of fuel supply increases generally in proportion to the increase of the load. Accordingly, there is a problem that the mixture ratio of fuel to air changes in dependence upon the load. That is to say, because the compressed air supplied to the combustor of the gas turbine is delivered by a compressor which is directly coupled to a rotor of the gas turbine, a generally constant amount of air is given to the combustor when the rotational speed of the rotor is constant.

In a combustor for conducting two-stage combustion, it is necessary to regulate and control fuel and air, particularly by supplying secondary fuel, so as to maintain the ratio of air flow rate to fluid flow rate constant in accordance with the load increase and always conduct stable combustion. With reference to a combustor having a fuel nozzle, so-called a single stage combustor, it has been disclosed in Japanese Patent Publication No. 45739/80 that the fuel ratio is maintained constant even though the fuel supply amount changes according to the turbine load. In this known art, a part of the whole combustion air is bled to be discharged into exhaust gas or the atmosphere over the wide range from low load operation to rated load operation as a measure of increasing the fuel ratio of combustible zone during the low load, and the amount of bleed air is contrarily decreased or reduced to zero during the high load, whereby the combustion air is controlled according to the respective loads. However, the control of flow rate by the air-bleeding disclosed in this known art is the regulation of air flowing into the whole combustor. The balance of distribution of the overall air flow rate is broken due to the air bleeding. Further, when this measure is applied to a two-stage combustor, the air of the primary stage is reduced and the air-fuel ratio at the primary stage is too rich, even though combustibility of the secondary stage is improved by the air-bleeding, because the overall air flow rate is regulated. As the result, the amount of nitrogen oxide (NOx) in the exhaust gas is increased and the amount of air for cooling the wall of the combustor is reduced. Consequently, there exists a problem in the life span of the combustor.

Also, a large amount of air flow has to be bled from the whole air for maintaining the secondary air flow at its desired rate since the secondary air flow rate is controlled by bleeding a certain amount of air from the overall air. As the air pressurized by the compressor is expelled out of the system for the above end, there is a disadvantage that a considerable reduction in efficiency occurs in the whole system of the gas turbine.

Thus, it is difficult to accomplish desirable performance even if the prior art is merely applied to the combustor of the two-stage combustion type, and there exist such disadvantages as mentioned above.

A method of regulating the amount of air mixed with secondary fuel by a mechanical vane has also been proposed in commonly assigned U.S. patent application Ser. No. 752680 with the movable mechanical vane being provided close to a secondary fuel nozzle to influence the reliability.

SUMMARY OF THE INVENTION

It is an object of the present invention to provide a combustor of two-stage combustion type which is capable of conducting low-temperature combustion for considerable reduction of NOx and maintaining the mixture ratio of secondary fuel to air at a desired extent for stable combustion.

Another object of the invention is to provide a gas turbine combustor of two-stage combustion type in which the occurrence of NOx is reduced due to low temperature diluted combustion at both the first and the second stage to attain high reduction of NOx and stable combustion can be maintained from low load operation to high load operation.

According to the invention, the flow rate of premixed air is regulated so as to maintain the ratio of air to fuel constant in accordance with the change of the fuel flow rate corresponding to turbine load, with respect to secondary combustion where the mixture of the air and the fuel premixed before combustion is supplied into a combustor for restraint of the occurrence of NOx. That is, the amount of air introduced to the secondary stage is controlled by bleeding the air effectively only from an air flow passageway to the secondary stage. During supply of the fuel to the secondary stage i.e. when the rate of the fuel flow is low, a large amount of air is bled, and when the fuel flow rate is increased in accordance with the increasement of load, the amount of bleed air is decreased, so that the control of the air bleeding is conducted to keep the mixture ratio of the fuel to the premixed air constant.

DETAILED DESCRIPTION OF PREFERRED EMBODIMENTS

Figure 1:
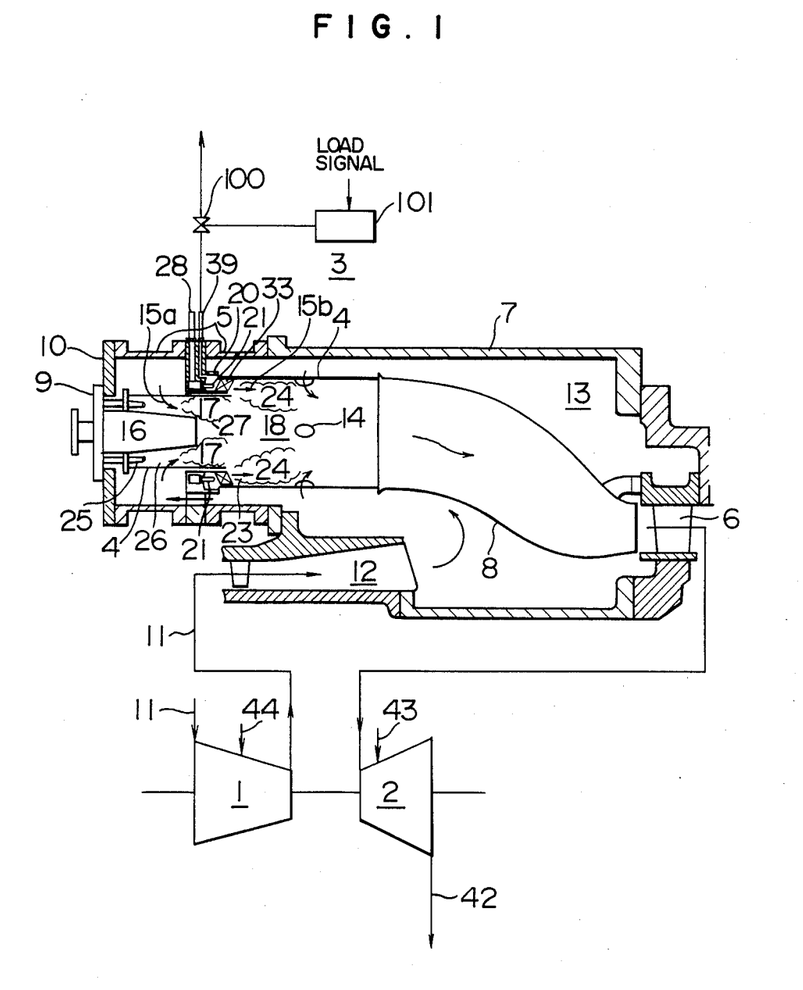
FIG. 1 is a cross-sectional view of a combustor for a gas turbine of two-stage combustion type in which the present invention is executed.
Figures 2A, 2B, 2C:
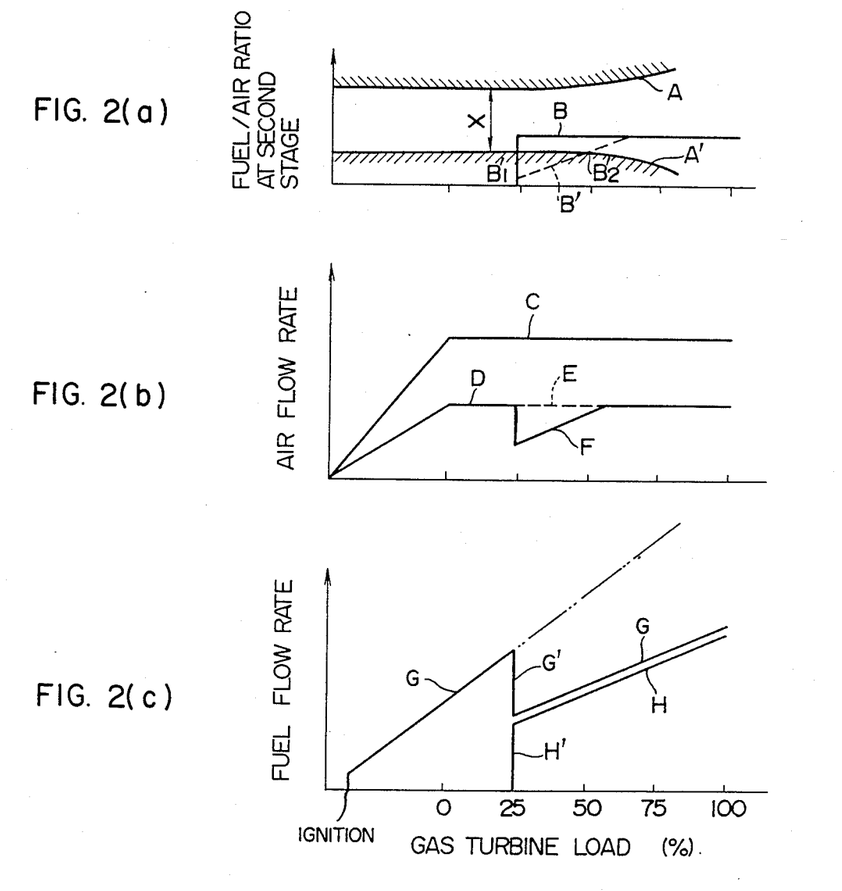
FIGS. 2(a), 2(b) and 2(c) are graphical illustrations depicting the relationships between gas turbine load versus secondary fuel ratio, air flow rate and fuel flow rate.

Referring now to the drawings wherein like reference numerals are used throughout the various views to designate like parts and, more particularly, to FIG. 1, according to this figure, a two-stage combustor according to the present invention whereby low NOx combustion can be achieved includes such major components as a compressor 1, a turbine 2, a combustor 3 and a generator (not shown). The combustor 3 comprises an inner pipe 4 for defining a combustion chamber, an outer pipe 5 encirculing the inner pipe 4, a casing 7 for defining a cylinder 13 and a tail pipe 8 through which combustion gas is introduced to turbine stator blades 6. A cover 10 is attached at the closed side end of the outer pipe 5, with a primary fuel nozzle body 9 being mounted on the cover 10. Air 11 compressed by the compressor 1 is introduced into the cylinder 13 through a diffuser 12 and further into the inner pipe 4 in the form of combustion air flows 15a, 15b through dilution air holes 14, wall cooling air holes and combustion air openings all formed in the inner pipe 4. The inner pipe 4 includes a front combustion chamber 17 having an inner cylindrical cone 16 mounted therein and a rear combustion chamber 18 of a large diameter than the front combustion chamber 14. Secondary air supply holes 20 are provided in a connecting section 19 between the front combustion chamber 17 and the rear combustion chamber 18. Fuel is injected out in the connecting section from secondary fuel nozzles 21 to be fed into the rear combustion chamber 18 together with secondary air 23 so as to form premixed combustion flame 24. Further, apertures 41 (FIG. 4) for bleeding a part of the secondary air are provided between the secondary air holes 20 and a secondary fuel mixture portion 33. A pipe line 39 leads from the apertures 41 to connect the same to an exhaust duct 42, the turbine at a position 43 before the turbine blades on and after the second stage or a midway stage 44 of the compressor, whereby an air flow rate flowing into a secondary stage is regulated. The air-bleed pipe line 39 is provided with a flow-rate regulating valve 100 which is controlled by a controller 101. Although, ignition of primary fuel 26 injected from primary fuel nozzles 25 is not shown, primary combustion flame 27 is formed by an ignition plug of piezoelectric compression type. The ignition of the secondary premixed mixture is carried out by applying fire thereto by the primary combustion flame 27. In FIGS. 2(a), 2(b) and 2(c), the abscissas indicate the gas turbine load and the ordinate respectively exhibit the secondary fuel ratio, the air flow rate and the fuel flow rate.

The combustor of two-stage combustion is operated with primary fuel G from the ignition to about 25% rate of the gas turbine load, and the primary fuel is reduced as shown by G' when the gas turbine load has reached 25% rate while secondary fuel H' is supplied simultaneously. Subsequently, the primary and secondary fuels G, H are gradually increased for a rise of the load. On the other hand, the air flow rate is increased corresponding to a rise of the rotational speed of the turbine, until the generator reaches a synchronous speed or while the gas turbine is operated with no-load, but the air flow rate becomes constant when the gas turbine is operated with load so that both of the primary and secondary air flow rate C, D are constant. The weight ratio of the secondary fuel to the air is shown in FIG. 2(a). In FIG. 2(a), there are shown an upper limit A above which the production of NOx is increased although the combustion state becomes better, and a lower limit A' below which the combustion state is not adequate and non-burned components increase too much although the production of NOx is reduced. The secondary combustion must be carried out within the range X bounded by the lower and upper limits. When the secondary air flow rate is not controlled after the flow is supplied to the secondary stage, that is, when the secondary air flow rate is kept constant from 0 to 100% of the gas turbine load as shown by the E line of FIG. 2(b), the ratio of the secondary fuel to the air results in the dashed line B' to become out of the range X during loaded period from B1' to B2' immediately after the supply of the secondary fuel. Thus, combustion cannot be continued and the supplied primary fuel is discharged in the form of non-burned component of hydrocarbon HC. Therefore, it is necessary to regulate the secondary air flow rate. According to the present invention, the air flow rate is controlled as shown by the line F of FIG. 2(b) with the air flow to the two-stage being bled after the supply of the secondary fuel. More specifically, the controller 101 in FIG. 1 receives load signals of the gas turbine and controls the amount of bleed air in accordance with the load as shown by the solid line in FIG. 3. The amount of bleed air is controlled by changing the extent to which the valve 100 is opened. Then, the ratio of the secondary fuel to the air results in the solid line B and is within the range X where the production of NOx is reduced and the combustion state is preferable so that the stable combustion can be maintained.

Figure 4:
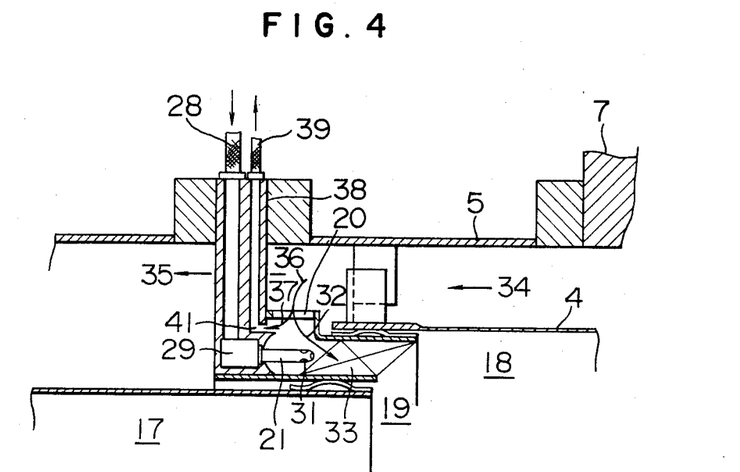
FIG. 4 is a detailed cross-sectional view of the air-bleed port portion FIG. 1.

The details of means for regulating and controlling the secondary air flow will be described with reference to FIG. 4.

Secondary fuel and air supply means are provided at the connecting section 19 of the front combustion chamber 17 and the rear combustion chamber 18. The fuel is first introduced from a plurality of secondary fuel introducing portions 28 into respective reservoirs 29 to be injected from a plurality of spouting holes 31 which open at the top ends of a plurality of secondary fuel nozzles 21 and be mixed with a secondary air flow 32. When the fuel and the air pass a swirler 33 which constitutes a mixing chamber, they are changed into a premixed mixture and introduced into the rear combustion chamber 18 to form premixed flame.

Figure 5:
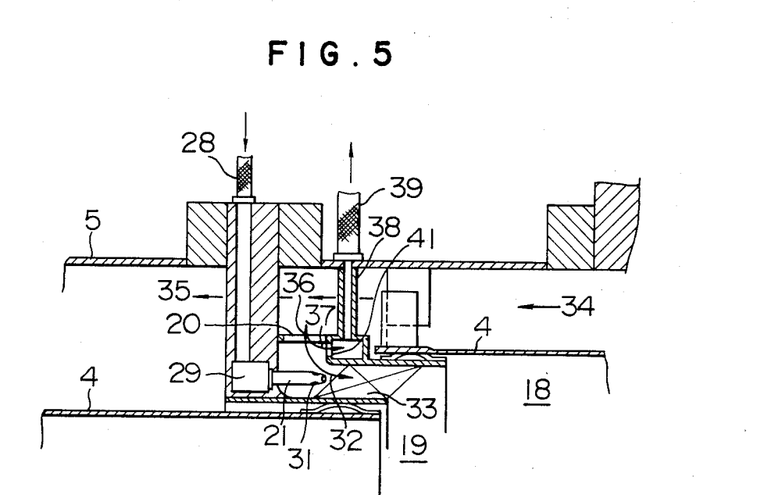
FIG. 5 is a detailed cross-sectional view of an air-bleed port portion of another embodiment of the invention.

Air flow 34 flowing between the inner pipe 4 and the outer pipe 5 branches into primary combustion air flow 35 and secondary combustion air flow 36. After the secondary air flow 36 passes through the combustion air holes 20, it branches into flow 32 toward the rear combustion chamber 18 and air flow 37 to be bled. The bleed air flow 37 is expelled into exhaust gas or the atmosphere while being regulated by the air-bleed valve 100 from air-bleed openings 41 through passageways 38 and the pipe line 39. Alternatively, the air flow 37 may be introduced to the turbine 2 at a position before the turbine blades on and after the second stage on the midway stage 44 (FIG. 1) of the compressor. On the other hand, it is preferable that the air-bleed openings 41 are provided to open in the passageway from the combustion air holes 20 to the fuel nozzles 21. It is not preferable that each air-bleed opening 41 is located in close proximity of the swirler 33 because the mixture is sometimes bled simultaneously with the bleed of air so that the fuel is also discharged out of the system. Also, it is not preferable that the openings 41 are located on the upstream side of the air holes 20 because a part of the combustion air 35 to be introduced into the primary stage is also bled. FIG. 5 shows a modification wherein the air-bleed openings 41 are provided on the reverse side as compared with those in the embodiment of FIG. 4 or the side of the rear combustion chamber 18 relative to the second combustion air holes 20. However, the secondary air flow regulating function of this modification is substantially the same as the first embodiment. Thus, when the secondary air flow rate is regulated from the secondary air flow passageway, the influence on the balance of distribution of the overall air can be suppressed to a low level unlike the prior art.

Figure 3:
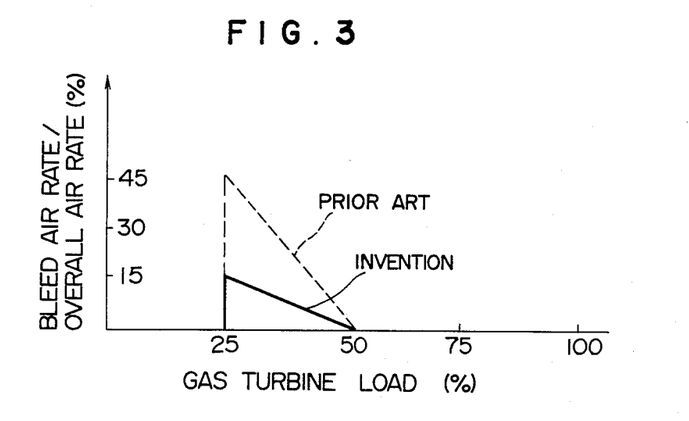
FIG. 3 is a graphical illustration of the relationship between the gas turbine load and air-bleeding rate.
Figure 6:
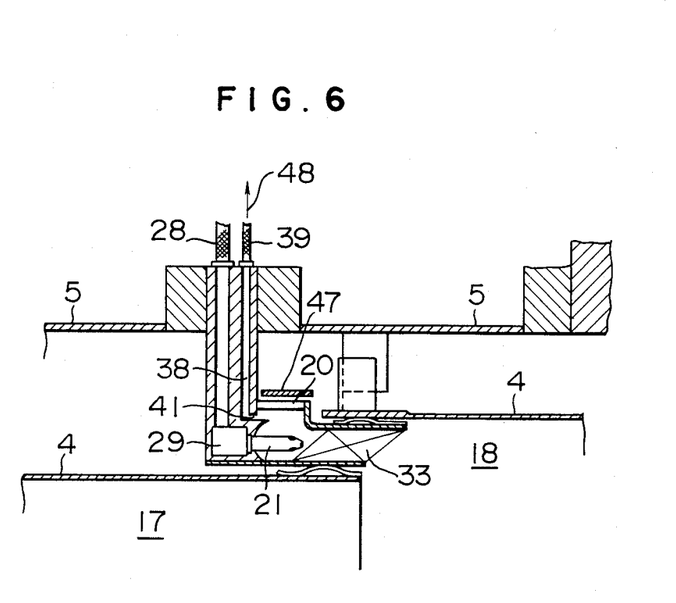
FIG. 6 is a detailed cross-sectional view of an air-bleed port portion of still another embodiment of the invention.
Figure 7A:
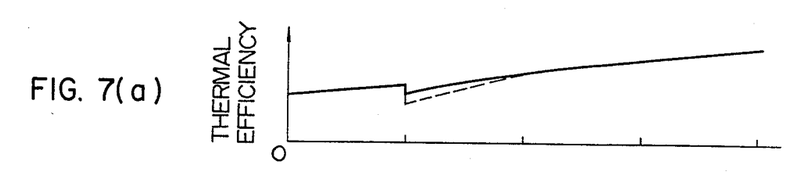
FIGS. 7(a)-7(d) are graphical illustrations of a control characteristic in the embodiment of FIG. 6.
Figure 7B:
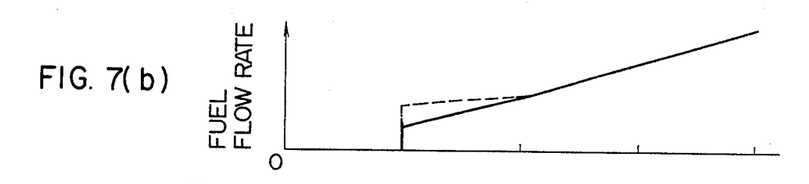
Figure 7C:
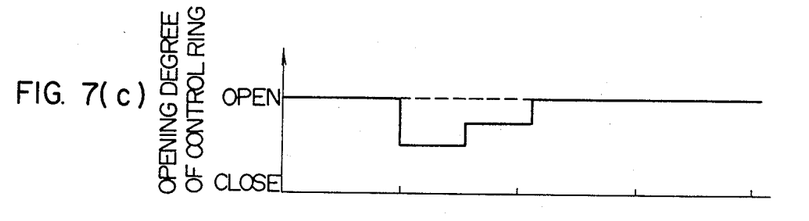
Figure 7D:
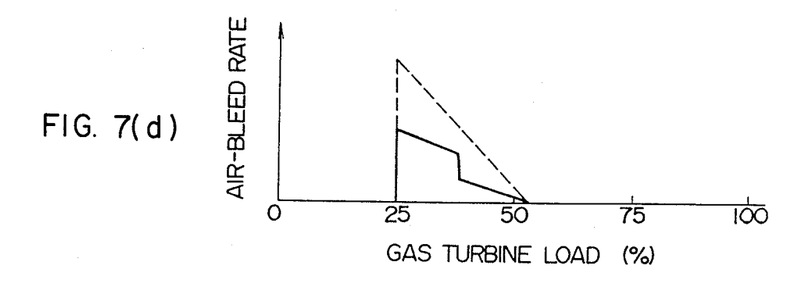

FIG. 3 shows the bleed air rate according to the invention in comparison with that according to the prior art. FIG. 3 represents a case where the secondary fuel is supplied from the point of 25% of the load, and the present invention is illustrated by the solid line and the prior art is by the dotted line. In case such fuel supply as shown in FIG. 2(c) is carried out, it is necessary to reduce the secondary air flow rate to about half of that at the time of rated load upon supplying of the secondary fuel so that the secondary fuel may be supplied to be mixed with the secondary air and then ignited to be bruned completely. As the air flow rate for secondary combustion at the time of rated load is about 30% of the overall air flow rate, it is necessary to reduce the secondary air flow rate to 15% when the secondary fuel is supplied. According to the present invention, therefore, it is necessary to bleed approximately 15% of all the air flow rate. If such an effect as mentioned above is attempted to be attained by the known art, all the air rate must be reduced to half level in order to decrease only the secondary air amount from the overall air. Then, it is required to bleed about 45% of the air even if it is taken into account that the gas turbine load is covered by the increase of the fuel flow rate compensating the decrease of the air amount. In this way, according to the prior art, the bleed air amount is required about three times so as to reduce the secondary air flow rate to half. Further, the occurrence of NOx at the primary stage is increased between the fuel ratio in the primary combustion becomes large due to 45% decrease of the overall air amount, and the balance of the combustion air distribution is broken since the amount of air flow for cooling the inner pipe of the combustor is reduced. Moreover, the turbine efficiency is decreased because the amount of bleed air is increased. When the amount of bleed air is increased, the turbine efficiency decreases owing to an increase of the fuel flow rate, and the whole efficiency of the turbine is decreased by about 0.3% responsively to the air bleeding from the overall air flow at 1% rate thereof. Accordingly, the turbine efficiency in the invention is decreased by about 5% in contrast to the decrease of about 13% in case of the prior art, so that the decrease of the turbine efficiency can be suppressed to about one third as compared that of the prior art. As a further preferable method, there is shown in FIG. 6 another embodiment wherein the bleed air amount 48 may be further reduced by attaching a covering 47 which is capable of changing the opening area of each secondary combustion air hole 20 gradually. FIGS. 7(a)–7(d) illustrate a result of the case where the combustor is operated to reduce the opening area of each air hole 20 under the operating condition in which the bleed air amount 48 is large, and to increase the opening area of each air hole 20 by sliding the covering 47 when the bleed amount is small. in FIGS. 7(a)–7(d), the case where the opening area is adapted to be phasedly changeable is shown by the solid line and the case where only the air-bleeding is carried out is represented by the dotted line. When the opening areas are controlled so as to open continuously or intermittently in accordance with the increase of load over than 25% of load, as shown by the solid line in FIGS. 7(a)–7(d), the bleed air amount and the fuel flow rate are reduced and the thermal efficiency is increased to result in further improvement of the efficiency of the combustor. That is, when the opening area is reduced by about 50%, the bleed air amount is reduced to about half and the decrease of thermal efficiency is reduced by hanf. Therefore, a sufficient result can be attained when both the air-bleeding method and the method of changing the opening areas are employed. In this case, the control of the opening areas of the air holes 20 by the covering 47 may be rough and thus, a design may be made giving priority to the reliability.

In addition, according to the embodiment of FIG. 6, a performance can be obtained at the approximately same degree as the prior art by regulating and controlling the opening areas of the air holes to reduce the bleed air amount to about ⅓ as compared to that of the prior art. The decrease of the turbine efficiency resulted from the air-bleeding can be suppressed to a minimum by controlling only secondary air flow rate.

Figure 8:
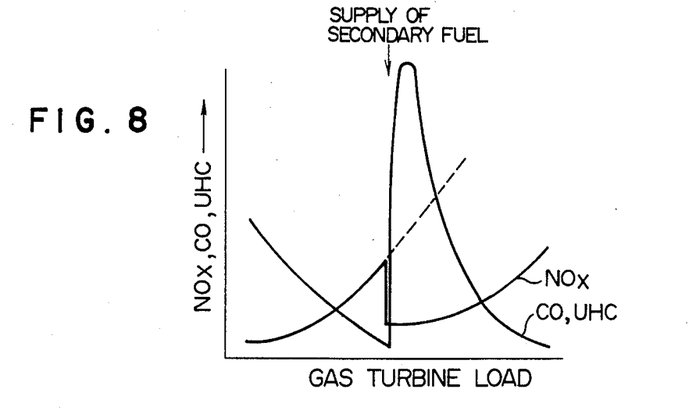
FIG. 8 is a graphical illustration diagram of NOx, CO and un-burned hydrocarbon UHC according to the prior art.
Figure 9:
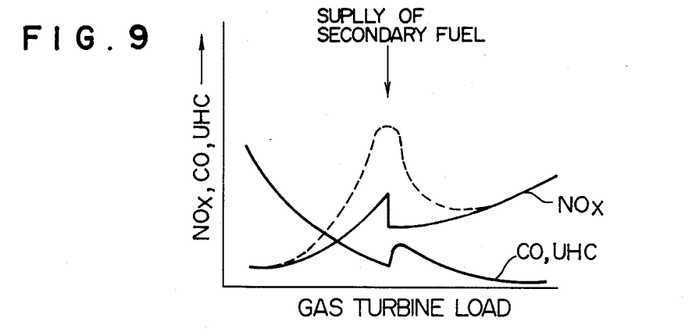
FIG. 9 is a graphical illustration diagram of NOx, CO and UHC according to the present invention.

FIGS. 8 and 9 diagrammatically illustrate a case where the secondary air flow rate is regulated by bleeding the air and a case where the secondary air flow rate is not regulated, respectively, and, in FIGS. 8 and 9, the axes of ordinate and abscissa are indicated at the same scale. FIG. 8 shows the case where the air flow rate is not regulated. The experiment was conducted under the actual loading condition of a 70 MW class gas turbine plant and the result is indicated in FIG. 8. The emission of nitrogen monoxide NO, hydrocarbon HC which are un-burned components is increased after the supplying of secondary fuel. This is for the reason that the air amount is large and the fuel ratio is low or lean so that the fuel to air ratio is out of the lower limit A' since the air flow amount is not regulated as described with reference to FIG. 2, and the emission of the un-burned components are increased. Accordingly, it is understood that the regulation of the secondary air flow rate at time of supplying the secondary fuel is required in order to reduce the un-burned components. There is shown in FIG. 9 the experimental result according to the present invention where the flow rate is regulated by bleeding a part of the air passed through the combustion air holes. The amount of the air flow for forming the premixed mixture is reduced since the secondary air flow is exhausted by bleeding a part thereof when the secondary fuel is supplied, and the condition that the air is slightly in excess of a small amount of fuel can be maintained so that the un-burned components as shown in FIG. 8 are scarcely exhausted. Thus, the combustion of high efficiency in which the production of NOx is reduced and the occurrence of the un-burned components is restrained can be conducted over a wide range from the supplying of the secondary fuel to the rated load operation, by bleeding the secondary air flow at the time of the supply of the secondary fuel and subsequently controlling the air flow rate for reduction of the bleed air rate in accordance with the increase of the fuel.

Figure 10:
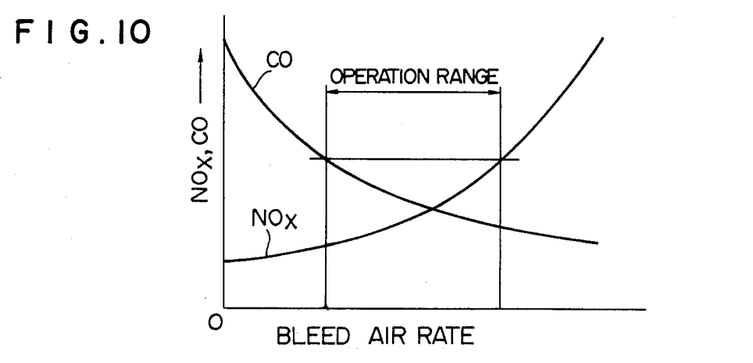
FIG. 10 is a characteristic diagram of the air-bleed rate, NOx and CO according to the prior art.

FIG. 10 diagrammatically illustrates a relationship between bleed air rate, and NOx and CO according to the prior art disclosed in Japanese Patent Publication No. 45739/80. An experimental result at the time of gas turbine load of 25% rate is shown in FIG. 10. In this case, unless the bleed air amount (the air bleed is carried out from the overall combustion air) is in excess to a certain extent, the density of CO which is an un-burned component is not reduced and the effect is not satisfactory. This is from the fact that the air-bleed is effected on the overall air amount for reduction of the secondary combustion air. As the overall air flow amount is required to be reduced to half so that the flow amount of the secondary air which corresponds to about 25% of the overall air flow amount may be reduced to about half, the efficiency of the secondary combustion cannot be improved unless a great amount of air is bled.

Also, the combustion in the primary stage changes to a high-temperature condition wherein the fuel is too rich, because the overall air amount is reduced by the air bleed to particularly decrease the air flow to the primary stage. For this reason, there exists a disadvantage that the occurrence of NOx at the primary stage is increased.

Figure 11:
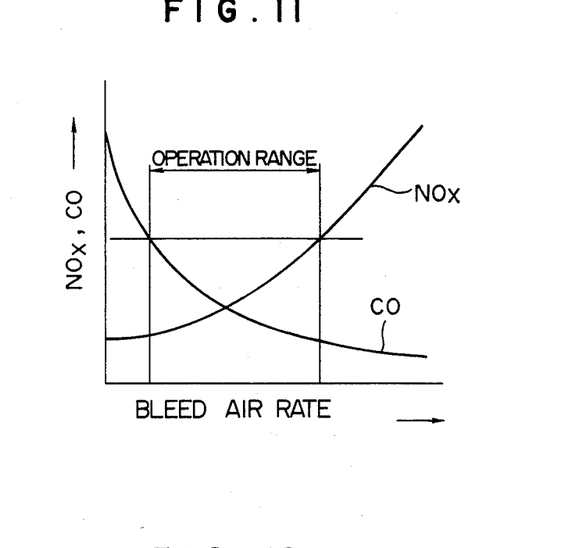
FIG. 11 is a graphical illustration diagram of the air-bleed rate, NOx and CO according to the present invention.

FIG. 11 is a characteristic graphical illustration of NOx and CO shown at the same scale as FIG. 10, and represents the result according to an embodiment of the present invention in which air is bled from a secondary air passage. As shown in FIG. 11, the secondary combustion efficiency is improved by a small amount of bleed air and the density of NOx in the exhaust can be reduced.

Figure 12:
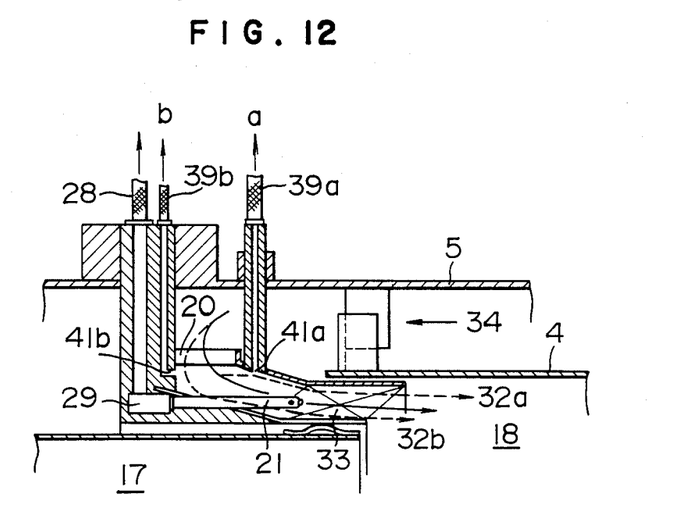
FIG. 12 is a detailed cross-sectional view of an air-bleed port portion according to still another embodiment of the invention.

FIG. 12 shows still another embodiment of the invention, in which each air-bleed opening or hole is separated into two sections that are respectively provided on the left and right sides of each secondary combustion air hole 20. When air is bled from an air-bleed opening 41a, the mixture flows in proximity to the outer peripheral wall of the rear combustion chamber 18 as shown by the dashed line 32a, and when the air is bled from an air-bleed opening 41b, the mixture flows on the inner side of the rear combustion chamber as shown by the dashed line 32b. Accordingly, in case that the secondary fuel is ignited by the primary flame 27, the ignition efficiency can be improved when the air is bled from the air-bleed opening 41b and the mixture is supplied around the center of the combustion chamber 18. When the air is bled from the air-bleed opening 41a after the ignition of the secondary fuel, the mixture flows along the inner wall of the inner pipe 4 so that the flame is cooled by the wall surface of the inner pipe 4 and lower temperature combustion can be effected.

Although an bleed air rate regulating value is required for each of air-bleed pipe lines 39a, 39b in the embodiment of FIG. 12, an effect of reduction of NOx can be achieved because of low temperature combustion which is resulted from the ignition of the secondary fuel improved as mentioned above.

According to the present invention, since only the secondary air to be controlled can be regulated by the air-bleed, the improvement of the secondary combustion efficiency can be attained with about one third of the bleed air amount as compared with the case where the air is bled from the overall air in a combustor as shown in the prior art. The change of the characteristics of the primary combustion does not occur and desirable combustion can be maintained, because the balance of the primary and overall air flow amount distribution is not broken. Therefore, a large reduction of NOx can be achieved over a wide range from ignition to the rated load without lowering the combustion efficiency.

What is claimed is:

1. A gas turbine combustor comprising an inner pipe means for defining a primary combustion chamber, primary fuel nozzle means provided in said primary combustion chamber, a secondary combustion chamber located downstream of said primary combustion chamber with respect to a flow of combustion gas, premixed fuel supply holes formed in a circumferential wall of said secondary combustion chamber for premixing fuel from secondary fuel nozzle means and air for supply thereof, a tail pipe means for introducing combustion gas produced in both said primary and secondary combustion chambers to gas turbine stator blades, an outer pipe means for encircling said inner pipe means and said tail pipe means to define an air passage between said inner pipe means and the outer pipe means, a casing means, at least one air-bleed passageway means for bleeding air out of the combustor between air holes for introducing secondary combustion air to be premixed with said secondary fuel and said secondary fuel nozzle means, and flow rate regulating means provided in said air-bleed passageway means for regulating a flow rate therethrough.

2. A gas turbine combustor according to claim 1, wherein said secondary combustion chamber has a larger diameter than a diameter of said primary combustion chamber, said premixed fuel supply holes are provided in an enlarged diameter part of the secondary combustion chamber and are disposed at a connecting portion between the primary combustion chamber and the secondary combustion chamber, and fuel swirler means are provided at said fuel supply holes.

3. A gas turbine combustor according to claim 1, wherein a cone is provided in said primary combustion chamber to extend from one end surface of said primary combustion chamber along an axis thereof, and said primary fuel nozzle means comprises a plurality of nozzles extending parallel to an axis of the cone in an annular space defined between said cone and a circumferential wall of said inner pipe means.

4. A gas turbine combustor according to claim 1, further comprising a controller means for controlling said flow rate regulating means, said controller means being adapted to receive turbine load signals and provide control signals to said flow rate regulating means to control an opening extent of said flow rate regulating means so as to maximize an amount of bleed air at a minimum point of load where the secondary fuel is supplied and to reduce the bleed air amount in accordance with an increase of the load from said minimum point.

5. A gas turbine combustor comprising primary fuel nozzle means for supplying fuel over an entire operation range of the gas turbine combustor from a starting of a gas turbine to full-load, a primary combustion chamber to which the primary fuel nozzle means opens and in which a pilot flame is formed, a secondary combustion chamber provided with means for supplying a mixture of secondary fuel and secondary combustion air on a circumferential wall of said secondary combustion chamber located downstream of the pilot flame, air-bleed means for bleeding a part of the secondary combustion air downstream of an intake for said secondary combustion air to discharge said part of the secondary combustion air outside the combustor, and means for controlling an amount of bleed air by said air-bleed means.

6. A gas turbine combustor according to claim 5, wherein said secondary fuel is supplied when the load of the gas turbine is above a predetermined value.

7. A gas turbine combustor according to claim 6, wherein said means for controlling an amount of bleed air receives gas turbine load signals and provides output control signals to control the air-bleed means so that the bleed air amount is maximized at said predetermined value of the load of the gas turbine and is reduced in accordance with an increase of the load of the gas turbine from said predetermined value.

8. A gas turbine combustor comprising a tube-like inner pipe means having a first closed end and a second end connected to primary stator blades of a gas turbine by a tail pipe means, an outer pipe means for encircling said inner pipe means to define an air passage between the inner pipe means and the outer pipe means, primary fuel nozzle means opening in a vicinity of the closed end of said inner pipe means, supply hole means for a mixture of secondary fuel and secondary combustion air which open on an outer peripheral wall of said inner pipe means on a side of the tail pipe means from said primary nozzle means, a secondary air passage means for communicating with said supply hole means, said secondary air passage means having secondary fuel nozzle means opened substantially midway of said secondary air passage means and air hole means for intaking the secondary combustion air from said air passage, an air-bleed passageway means opening upstream of a position where the secondary fuel nozzle means of said secondary air passage means opens, and a fuel rate regulating valve means provided in the air-bleed passageway means, and means for controlling said flow rate regulating valve means so that an amount of bleed air flowing through said air-bleed passageway means may be maximized at a minimum point of a load of the gas turbine where fuel is supplied from said secondary fuel nozzle means.

9. A gas turbine combustion according to claim 8, wherein said inner pipe means comprises two tube bodies having a different diameter from each other, one of the tube bodies on a closed side of said inner pipe means has a smaller diameter and the other tube body on the side of the tail pipe means has a larger diameter, and wherein said secondary mixture supply hole means open at a position where the diameter of said inner pipe means is changed in a stepped manner.

* * * * *